March 17, 1942.   W. H. JACOBI   2,276,980
CONDENSER BUSHING WINDING MACHINE
Filed Feb. 25, 1939   2 Sheets-Sheet 1
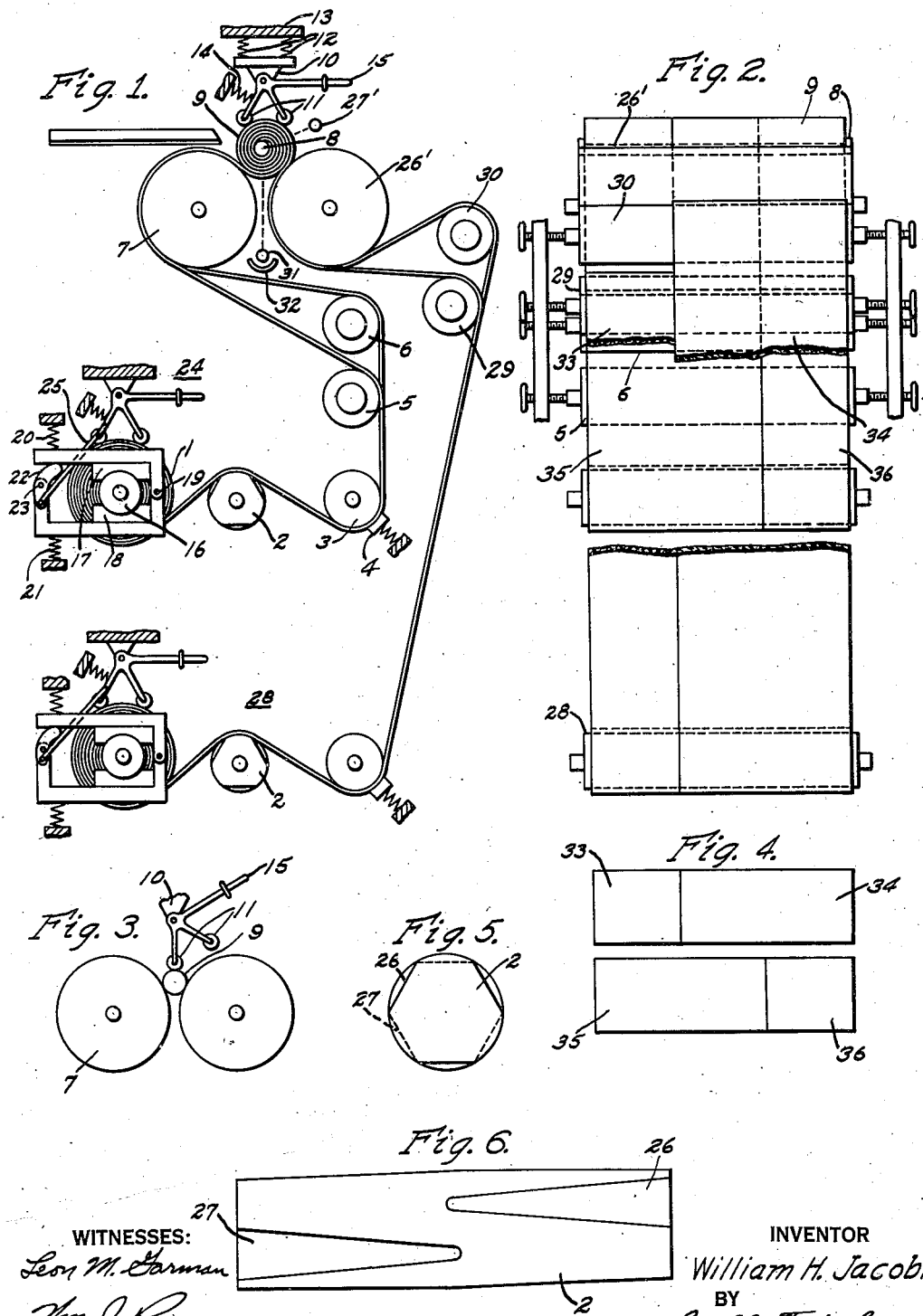
WITNESSES:
Leon M. Garman
Wm. J. Ruano
INVENTOR
William H. Jacobi.
BY
Paul E. Friedemann
ATTORNEY March 17, 1942.   W. H. JACOBI   2,276,980
CONDENSER BUSHING WINDING MACHINE
Filed Feb. 25, 1939   2 Sheets-Sheet 2

WITNESSES:
Leon M. Garman
Wm. J. Ruano

INVENTOR
William H. Jacobi.
BY
Paul E. Friedemann
ATTORNEY

Patented Mar. 17, 1942

2,276,980

UNITED STATES PATENT OFFICE 2,276,980

CONDENSER BUSHING WINDING MACHINE

William H. Jacobi, Wilkinsburg, Pa., assignor to Westinghouse Electric & Manufacturing Company, East Pittsburgh, Pa., a corporation of Pennsylvania Application February 25, 1939, Serial No. 258,558

12 Claims. (Cl. 242—75)

My invention relates to a winding machine and more specifically to a machine for winding condenser bushings.

The making of condenser bushings from paper, or other suitable laminated insulating materials, entails the requirement that the ultimate structure shall be uniformly dense throughout, in order to obtain fair and reliable constant working values of the dielectric as well as mechanical strength of the resulting mass. Prior to the actual rolling or forming of the bushing, the materials used must be adequately prepared and conditioned to stabilize their structure and equalize or compensate for inherent variations the laminated materials may possess.

Another requirement is that, in the course of rolling or forming of the bushings, it may be desired to impregnate the paper, or other laminated material used, with suitable insulating fluids to increase the dielectric strength, or with other elements to impress particular properties on the bushing.

Still another desirable requirement is to provide means by which a plurality of sheets can properly and simultaneously be wound to facilitate production and, in certain cases, to make longer bushings than the commercial widths of paper sheets or other laminated materials permit. In preparing the paper for winding, one requirement is that the sheet must be evenly stretched over rolls and move at such speed as to allow time for unfolding and avoid forming any wrinkles or corrugations to which the paper, or other laminated material, may be susceptible. The necessary tension which must be impressed in the paper to accomplish this must be maintained constant and be of such amount as to equalize variations in the texture of the paper, and, in addition, insure uniformity in the structure of the bushing to be wound.

An object of my invention is to provide a condenser bushing which is uniformly dense throughout.

Another object of my invention is to provide a winding machine which will wrap two or more sheets simultaneously about a single spindle to form a condenser bushing which is longer than the widths provided by standard paper or other insulating material rolls.

Another object of my invention is to provide a device which will maintain a constant tension throughout the width of a sheet being wound and which sheet will be evenly stretched over the condenser bushing without forming wrinkles or corrugations therein.

Another object of my invention is to provide a device which will apply a force on the bushing as it is being wound to effect proper wrapping and bonding, which force will vary in accordance with the diameter of the bushing.

Other objects and advantages will become more apparent from a study of the following specification when considered in conjunction with the accompanying drawings, in which:

Figure 1 is a schematic side view of my invention as applied to a winding machine for a condenser bushing;

Fig. 2 is a front view of the arrangement shown in Fig. 1;

Fig. 3 is a view showing the position of the swivel pressure rollers of Fig. 1 when the diameter of the bushing is small;

Fig. 4 is a front view of the adjustable idling rollers shown in Figs. 1 and 2;

Fig. 5 is a side view of the tension equalizing idling roller of Figs. 1 and 2;

Fig. 6 is a front view of the idling roller shown in Fig. 5; and

Figure 7:
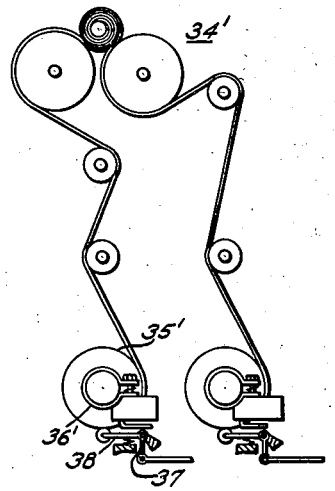

Figs. 7 to 12, inclusive, show various modifications of the paper tensioning equalizing means.

Referring to Fig. 1, numeral 1 denotes a supply roll of paper or other insulating material, the sheet of which is first led around a portion of the periphery of the flat crowned tension equalizing roller 2 and then around an idling roller 3, which is provided with a felt friction shoe 4 to iron out possible wrinkles in the paper. From the idling roller 3, the sheet is led around an adjustable idling roller 5, from which it is then led around the heated, forming roller 7, thence on to a copper condenser spindle 8 upon which it is wrapped forming a condenser bushing 9. Since heated paper is highly hygroscopic, the positioning of the heated forming roller next to the condenser bushing eliminates the possibility of absorption of moisture by the heated paper before being incorporated in the condenser bushing structure. Above the condenser bushing 9, there is provided a downward pressure applying means which comprises a yoke 10 having a plurality of swivelled pressure rollers 11, which yoke is urged in a downward direction by means of springs 12 which are anchored to a frame 13. The pressure rollers 11 are biased in a counter-clockwise direction by means of a spring 14. The pressure rollers may also be moved in either the clockwise and counter-clockwise direction by means of a handle 15. The downward pressure applied through the yoke and its complement of rollers is wholly delivered on a narrow line contact along the length of the bushing. The bushing is somewhat soft and not very resilient especially as it grows in diameter with the result that indentations and consequent corrugations of the structure of the bushing are easily produced. Furthermore, at the line of contact of the incoming paper with the body of the bushing, the effective pressure producing the bond between the layers varies; that is, decreases as the diameter of the bushing grows due to the continually decreasing angle between the center of the spindle and the contact points. To equalize these variations as well as to provide suitable clearances for handling spindles, copper rods, and tubes on which bushings are wound, a swivel arrangement of rollers such as described which is urged downwardly by the force of springs is provided.

Referring to Fig. 3, it will be noted that when the condenser bushing 9 is very small in diameter, the rollers 11 will be urged in a counterclockwise direction as shown, so that the force of spring 12 is applied through a single roller. Thus the entire force of springs 12 is concentrated on a single line of contact throughout the length of the condenser bushing 9. As the bushing 9 grows in diameter to an extent such as shown in Fig. 1, the swivelled rollers are swung into position either automatically or by means of the manually operated handle 15, thus distributing the pressure along two lines of contact on the bushing thereby easing up on the pressure on the bushing at a time when its structure is softer to avoid formation of indentations or corrugations in the very soft bushing structure. Thus, it will be seen that a uniformly dense condenser bushing is provided.

To further improve uniformity of the condenser bushing, it is necessary to provide a constant tension which is uniformly distributed along the width of the sheet before it contacts forming roller 7. Supply roll 1 is provided with a brake drum 16 and a pair of brake shoes 17 and 18 which are pivoted at point 19. Brake shoes 17 and 18 are urged into frictional engagement with drum 16 by means of springs 20 and 21, respectively. A cam element 22 is pivoted at point 23 on an arm extending from the brake shoe 18. A yoke and swivelled roller arrangement 24, similar to that previously described, is provided, there being a link 25 connecting one of the roller arms to the cam 23. In this instance, however, the downward force of the spring is unnecessary since the bonding quality of the supply roll is of no great importance, hence the springs may be omitted.

It should be noted that the power input to the winding machine is applied to spindle 8. To provide a constant tension in the sheet as it leaves the supply roll, it is necessary to provide a braking force on drum 16, which force is proportional to the diameter of the supply roll 1. In other words, since the force or tension of the paper is to be maintained constant and since the moment arm thereof decreases as the diameter of the roll 1 decreases, thus decreasing the torque applied to roll 1 by the paper, it will be observed that to counteract such torque, the braking force which is applied to the constant diameter drum 16 must continually decrease as the diameter of roll 1 decreases. In order to distribute the tension evenly throughout the width of the sheet as it leaves the supply roll 1, a tension equalizing flat crowned roller 2 is provided, the structure of which is more clearly shown in Figs. 5 and 6. Roll 2 is provided with alternate grooves or flat portions 26 and 27 which extend from a central part of the cylindrical roller to each of the ends of the cylinder, alternately. Roller 2, of course, is susceptible to any other configuration which will provide an irregular surface thereon, the purpose of which is to create a flapping of the paper sheet; that is, a wave-like motion, the purpose of which is to evenly distribute the tension of the paper along the width of the sheet, as distinguished from the ordinary smooth cylindrical idling roller which tends to concentrate the tension along one portion of the sheet.

Referring to Fig. 1, it will be noted that a complementary forming roller 26' is provided and which, together with the forming roller 7, forms a support for the bushing 9. In cases where it is desired to form a long condenser bushing which is longer than the width commercial supply rolls will permit, it is possible to provide a second supply roll similar to supply roll 1 with its attendant brake structure, the sheet from which is led around rollers 2 and 3, and thence on to the other of the adjustable idling rollers 6.

Referring to Fig. 2, it will be noted that idling rollers 5 and 6 are longitudinally adjustable relative to each other for the purpose of lining up the sheets from the two supply rolls in exact butting relation before they are entrained about the forming roller 7. A tubular spray 27' carrying impregnating material is provided to saturate bushing 9 in the course of winding. The forming roll 7 and, if desired, also the forming roll 26' are heated to soften and cure the shellac or other impregnating material with which the paper is treated and which is used as a bonding medium. If it is desired to wind two layers simultaneously onto bushing 9, a second train of rollers, supply rolls, etc., 28, which is identical with the train of rollers described above, may be provided. The second train of rollers, however, conducts the sheets around idling rollers 29 and 30 and thence on to the heated forming roller 26'. In order to start such a bushing, the sheets from rollers 29 and 30 are threaded first followed by the sheets from rollers 5 and 6. The free ends of all the sheets are pulled and made equally taut on the starting of each bushing. A second tubular spray 31 is provided to saturate the bushing with suitable impregnating material, which is fitted with a drip pan 32 to catch overflow of impregnating material and thus protect the fresh incoming sheet below. The valves controlling the tubular sprays when used are open, as soon as the first turn of paper has engaged the spindle or copper rod.

It will be obvious that the structure just described provides a machine which will wrap one or more sheets on to a spindle. In other words, if it is desired to wrap only one sheet around spindle 8, a single supply roll 1 is provided and one of the adjustable rollers 5 or 6 is eliminated, whereas if it is desired to have two sheets wrapped simultaneously so as to form an elongated condenser bushing, the rollers 5 and 6 are both provided and a second supply roller is provided. If it is desired to wrap two layers simultaneously, each of which comprises two sheets wrapped in butting relation, then four supply rolls and four adjustable rollers 5, 6, 29 and 30 are provided. It is obvious, of course, that a greater number than four sheets may also be provided, in which event additional supply rolls and additional idling adjustable rollers may be provided. In wrapping two layers simultaneously, each of which layers comprise two sheets in butting relationship, it is highly desirable to stagger the butt joints in a manner which is shown in Fig. 2. In other words, sheet 33 of narrow width which is wound in butting relation with a sheet 34 of wide width forming the first layer are matched with sheet 35 of wide width and sheet 36 of narrow width of the second layer in a manner so that the butt joints of the sheets of the different layers are in staggered relationship. Fig. 4 schematically shows the disposition of the supply rolls to show the staggered relationship of the butt joints. The staggering of the alternate butted sheet layers on the condenser bushing eliminates the possibility of a leakage path which may be detrimental to the operation of a condenser bushing.

Figs. 7 to 12, inclusive, show various modifications of the sheet material tensioning means. Therefore, any of the devices hereinafter described may be substituted for the yoke and swivel assembly brake and tension equalizing roller 2. Fig. 7 shows a bushing and forming roll assembly 34' and a pair of supply rolls 35', each of which is equipped with a pneumatically controlled brake 36', the fluid pressure of which is controlled by a lever 37 which is connected to the pressure control valve (not shown). As the spring-pressed arm 38 moves radially inwardly of the supply roll as the diameter thereof becomes smaller, the lever 37 moves clockwise and actuates the pressure control valve and relieves the braking pressure.

Figure 8:
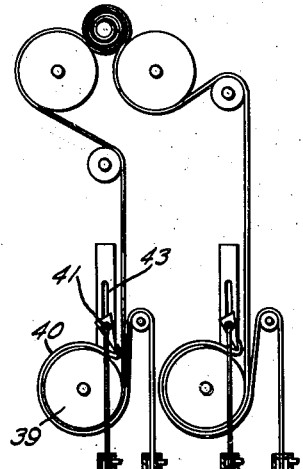

Fig. 8 shows another modification of the means for equalizing the tension of the sheet material. Each supply roll 39 has a friction band 40 wrapped therearound, which band has one end fastened to a vertically movable member 41 and the other end connected to a piston in a chamber 42. As the diameter of the supply roll 39 decreases, member 41 is guided downwardly along a slot 43 thereby maintaining a substantially constant wrapping tension on the supply roll 39. A piston in the piston chamber 44 is connected to member 41 and constantly urges it downwardly.

Figure 9:
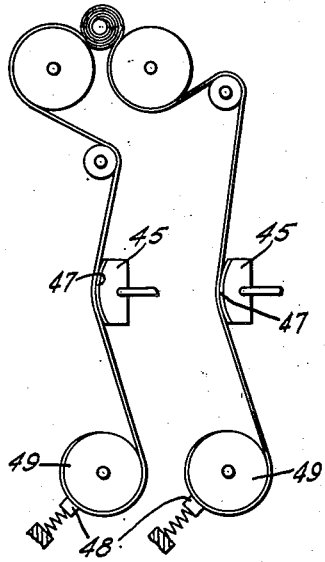
Figure 10:
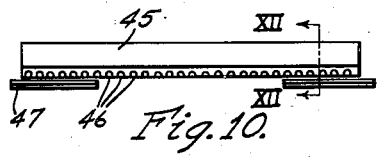
Figure 11:
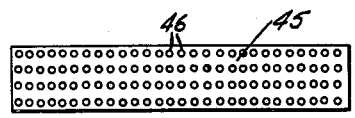
Figure 12:
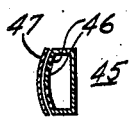

Figs. 9, 10, 11 and 12 show another means for providing constant tension in the sheet material. Fig. 9 is a schematic view of a vacuum box. Fig. 10 is a top view of the vacuum box. Fig. 11 is the front view thereof, and Fig. 12 is a sectional view taken along the line XII—XII of Fig. 10.

The vacuum box 45 has an arcuate surface which contains a plurality of holes 46. Slidable along the surface of the arcuate portion of the box is one or more arcuate screens 47, the purpose of which is to cover up or close any number of perforations of the vacuum box in order to accommodate sheet material having widths smaller than that of the vacuum box. The vacuum in the vacuum box 45 exerts through the holes 46 an attractive pressure on the paper, thereby effecting a tension thereon, which tension is substantially uniform throughout the surface of the paper in contact with the box. A spring actuated brake 48 is applied to the supply roll 49 in order to keep the supply roll 49 from unraveling.

The teachings of my invention are not limited to condenser bushing winding machines alone, but are applicable to any winding machine whatsoever used for the winding of sheet material, such as, for example, paper winding machines. Furthermore, the sheet material may be of any suitable composition whatsoever.

I am, of course, aware that others, particularly after having had the benefit of the teachings of my invention, may devise other forms of winding machines embodying my invention, and I, therefore, do not wish to be limited to the specific showings made in the drawings and the descriptive disclosure hereinbefore made, but wish to be limited only by the scope of the appended claims.

I claim as my invention:

1. In a machine for uniformly winding a plurality of sheets onto a single spindle, comprising, in combination, a spindle, supply means for furnishing two sheets to be wrapped around said spindle to form a single roll, a means for continuously applying a force to a small area along the length of the outermost sheet layer of said roll as it is being wound to effect tight wrapping thereof, a means responsive to an increase in the diameter of the roll for distributing said force into a plurality of smaller components which are applied to a plurality of small arcs along different lines on said outermost sheet layer.

2. In a machine for uniformly winding a plurality of sheets onto a single spindle, comprising, in combination, a spindle, supply means for furnishing two sheets to be wrapped around said spindle to form a single roll, spring means, a plurality of rollers which are positioned between said spring means and said roll and which are biased with respect to said roll in such manner that said spring means exerts pressure through only one of said rollers on the outermost layer of said roll when the diameter of the roll is small and through a plurality of said rollers when the diameter of said roll becomes large.

3. In a machine for uniformly winding a plurality of sheets onto a single spindle comprising, in combination, a spindle, a plurality of supply rolls for furnishing sheet material to be wrapped around said spindle, roller means between said supply rolls and said spindle along a portion of the periphery of which said sheet material is led from said supply rolls to said spindle, said roller means including a roller having an irregular surface to effect flapping or wave-like motion of said sheet material to effect even tension distribution throughout the width thereof, said roller means including a plurality of rollers which are longitudinally adjustable with respect to each other for adjusting the individual sheets of the supply rolls in butting relation before they are finally wrapped around said spindle; and means for automatically braking said supply rolls in an amount which varies in proportion to the diameter of the supply rolls.

4. In a machine for uniformly winding a plurality of sheets onto a single spindle comprising, in combination, a spindle, a pair of supply rolls for furnishing two sheets to be wrapped around said spindle, means between said supply rolls and said spindle for leading said two sheets including an irregularly shaped roller for effecting flapping or wave-like motion of both sheets, and a pair of longitudinally adjustable rollers, one for each sheet, for adjusting said two sheets into butting relation before they are fed around said spindle.

5. In a machine for uniformly winding a plurality of sheets onto a single spindle comprising, in combination, a spindle, a pair of supply rolls for furnishing two sheets to be wrapped around said spindle, means between said supply rolls and said spindle for leading said two sheets including an irregularly shaped roller for effecting flapping or wave-like motion of both sheets, and a pair of longitudinally adjustable rollers, one for each sheet, for adjusting said two sheets into butting relation before they are fed around said spindle, and means for braking said supply rolls in proportion to the diameter of said supply rolls.

6. In a machine for uniformly winding a plurality of sheets onto a single spindle comprising, in combination, a spindle, a pair of supply rolls for furnishing two sheets to be wrapped around said spindle, means between said supply rolls and said spindle for leading said two sheets including an irregularly shaped roller for effecting flapping or wave-like motion of both sheets, and a pair of longitudinally adjustable rollers, one for each sheet, for adjusting said two sheets into butting relation before they are fed around said spindle, and means for continuously applying a force on a small area along the width of the outermost sheets as they are being wrapped about said spindle to form a roll and means for distributing said force over a larger area on a plurality of lines along the width of said outermost sheets, said last named means being responsive to an increase in the diameter of said last named roll.

7. In a machine for uniformly winding a plurality of sheets onto a single spindle comprising, in combination, a spindle, a pair of supply rolls for furnishing two sheets to be wrapped around said spindle, means between said supply rolls and said spindle for leading said two sheets including an irregularly shaped roller for effecting flapping or wave-like motion of both sheets and a pair of longitudinally adjustable rollers, one for each sheet, for adjusting said two sheets into butting relation before they are fed around said spindle, means for braking said supply rolls in proportion to the diameter of said supply rolls, and means for continuously applying a force on a small area along the width of the outermost sheets as they are being wrapped about said spindle to form a roll and means for distributing said force over a larger area on a plurality of lines along the width of said outermost sheets, said last named means being responsive to an increase in the diameter of said last named rolls.

8. In a machine for uniformly winding a plurality of sheets onto a single spindle comprising, in combination, a pair of forming rollers, a spindle which is supported by and between said forming rollers, a plurality of supply rolls for supplying a plurality of sheets in butting contact relation to one of said forming rollers and thence to said spindle, a second plurality of supply rolls for supplying a plurality of sheets in butting contact relation to the other of said forming rollers, and thence to said spindle, the sheets from said first forming roller being wound simultaneously in overlapping relationship with the sheets from said second forming roller onto said spindle to form alternate layers thereon, the butt joints of said alternate layers being in staggered relationship.

9. In a machine for uniformly winding a plurality of sheets onto a single spindle comprising, in combination, a pair of forming rollers, a spindle which is supported by and between said forming rollers, a plurality of supply rolls for supplying a plurality of sheets in butting contact relation to one of said forming rollers and thence to said spindle, a second plurality of supply rolls for supplying a plurality of sheets in butting contact relation to the other of said forming rollers, and thence to said spindle, the sheets from said first forming roller being wound simultaneously in overlapping relationship with the sheets from said second forming roller onto said spindle to form alternate layers thereon, the butt joints of said alternate layers being in staggered relationship, and a longitudinally adjustable roller for each of said supply rolls for guiding its respective sheet onto one of said forming rollers, said adjustable rollers permitting butting contact relationship of the sheets fed onto each of said forming rollers.

10. In a machine for uniformly winding a plurality of sheets onto a single spindle comprising, in combination, a pair of forming rollers, a spindle which is supported by and between said forming rollers, a plurality of supply rolls for supplying a plurality of sheets in butting contact relation to one of said forming rollers and thence to said spindle, a second plurality of supply rolls for supplying a plurality of sheets in butting contact relation to the other of said forming rollers, and thence to said spindle, the sheets from said first forming roller being wound simultaneously in overlapping relationship with the sheets from said second forming roller onto said spindle to form alternate layers thereon, the butt joints of said alternate layers being in staggered relationship, and means for maintaining substantially constant tension along the width of each of said sheets.

11. In a machine for uniformly winding a plurality of sheets onto a single spindle comprising, in combination, a pair of forming rollers, a spindle which is supported by and between said forming rollers, a plurality of supply rolls for supplying a plurality of sheets in butting contact relation to one of said forming rollers and thence to said spindle, a second plurality of supply rolls for supplying a plurality of sheets in butting contact relation to the other of said forming rollers, and thence to said spindle, the sheets from said first forming roller being wound simultaneously in overlapping relationship with the sheets from said second forming roller onto said spindle to form alternate layers thereon, the butt joints of said alternate layers being in staggered relationship, and means for continuously applying a force on a small area along the width of the outermost sheets as they are being wrapped about said spindle to form a roll and means for distributing said force over a larger area on a plurality of lines along the width of said outermost sheets, said last named means being responsive to an increase in the diameter of said last named roll.

12. In a machine for uniformly winding a plurality of sheets onto a single spindle comprising, in combination, a pair of forming rollers, a spindle which is supported by and between said forming rollers, a plurality of supply rolls for supplying a plurality of sheets in butting contact relation to one of said forming rollers and thence to said spindle, a second plurality of supply rolls for supplying a plurality of sheets in butting contact relation to the other of said forming rollers, and thence to said spindle, the sheets from said first forming roller being wound simultaneously in overlapping relationship with the sheets from said second forming roller onto said spindle to form alternate layers thereon, the butt joints of said alternate layers being in staggered relationship, and means for spraying impregnating material between the sheets as they are being wound onto said spindle, said forming rollers being heated so as to effect bonding of said impregnating material.

WILLIAM H. JACOBI.